United States Patent
Ghaffari et al.

(10) Patent No.: US 10,300,371 B2
(45) Date of Patent: May 28, 2019

(54) METHOD AND SYSTEM FOR INTERACTING WITH A VIRTUAL ENVIRONMENT

(71) Applicant: MC10, Inc., Lexington, MA (US)

(72) Inventors: Roozbeh Ghaffari, Cambridge, MA (US); Milan Raj, Natick, MA (US); Bryan McGrane, Cambridge, MA (US)

(73) Assignee: MC10, Inc., Lexington, MA (US)

( * ) Notice: Subject to any disclaimer, the term of this patent is extended or adjusted under 35 U.S.C. 154(b) by 81 days.

(21) Appl. No.: 15/281,960

(22) Filed: Sep. 30, 2016

(65) Prior Publication Data

US 2017/0095732 A1  Apr. 6, 2017

Related U.S. Application Data

(60) Provisional application No. 62/235,793, filed on Oct. 1, 2015.

(51) Int. Cl.
*A63F 13/212* (2014.01)
*A63F 13/211* (2014.01)
(Continued)

(52) U.S. Cl.
CPC .......... *A63F 13/212* (2014.09); *A63F 13/211* (2014.09); *A63F 13/26* (2014.09);
(Continued)

(58) Field of Classification Search
CPC .... A63F 13/211; A63F 13/212; A63F 13/428; A63F 2300/105; A63F 2300/1012; A63F 2300/8082
(Continued)

(56) References Cited

U.S. PATENT DOCUMENTS 3,716,861 A   2/1973 Root
3,805,427 A   4/1974 Epstein
(Continued)

FOREIGN PATENT DOCUMENTS

CN           202068986 U    12/2011
DE    10 2007 046 886 A1    4/2009
(Continued)

OTHER PUBLICATIONS

Carvalhal et al., "Electrochemical Detection in a Paper-Based Separation Device", Analytical Chemistry, vol. 82, No. 3, (1162-1165) (4 pages) (Jan. 7, 2010).
(Continued)

*Primary Examiner* — Michael A Cuff
(74) *Attorney, Agent, or Firm* — Nixon Peabody LLP

(57) ABSTRACT

A system for providing a more personalized virtual environment for a user, the system including one or more sensing devices that detect one or more physical, physiological, or biological parameters of the user and transmit the same to a game console or virtual reality controller that produces the virtual environment. The game console or virtual reality controller can analyze the sensor data and adjust one or more aspects of the virtual environment as a function of the sensor data. For example, the difficulty level or scariness level of a game can be decreased if the heart rate of the user exceeds a predetermined threshold.

11 Claims, 6 Drawing Sheets

(51) Int. Cl.
  *A63F 13/428* (2014.01)
  *H04L 29/08* (2006.01)
  *H04L 29/06* (2006.01)
  *A63F 13/26* (2014.01)
  *A63F 13/67* (2014.01)

(52) U.S. Cl.
  CPC ............ *A63F 13/428* (2014.09); *A63F 13/67* (2014.09); *H04L 67/12* (2013.01); *H04L 67/38* (2013.01); *A63F 2250/10* (2013.01); *A63F 2250/1026* (2013.01); *A63F 2250/26* (2013.01); *A63F 2300/105* (2013.01); *A63F 2300/1012* (2013.01); *A63F 2300/8082* (2013.01)

(58) Field of Classification Search
  USPC .......................................................... 463/31
  See application file for complete search history.

(56) References Cited

U.S. PATENT DOCUMENTS

| | | |
|---|---|---|
| 3,838,240 A | 9/1974 | Schelhorn |
| 4,278,474 A | 7/1981 | Blakeslee |
| 4,304,235 A | 12/1981 | Kaufman |
| 4,416,288 A | 11/1983 | Freeman |
| 4,658,153 A | 4/1987 | Brosh |
| 4,911,169 A | 3/1990 | Ferrari |
| 5,059,424 A | 10/1991 | Cartmell |
| 5,272,375 A | 12/1993 | Belopolsky |
| 5,306,917 A | 4/1994 | Black |
| 5,326,521 A | 7/1994 | East |
| 5,331,966 A | 7/1994 | Bennett |
| 5,360,987 A | 11/1994 | Shibib |
| 5,471,982 A | 5/1995 | Edwards |
| 5,454,270 A | 10/1995 | Brown |
| 5,491,651 A | 2/1996 | Janic |
| 5,567,975 A | 10/1996 | Walsh |
| 5,580,794 A | 12/1996 | Allen |
| 5,617,870 A | 4/1997 | Hastings |
| 5,811,790 A | 9/1998 | Endo |
| 5,817,008 A | 10/1998 | Rafert |
| 5,907,477 A | 5/1999 | Tuttle |
| 6,063,046 A | 5/2000 | Allum |
| 6,220,916 B1 | 4/2001 | Bart |
| 6,265,090 B1 | 7/2001 | Nishide |
| 6,282,960 B1 | 9/2001 | Samuels |
| 6,343,514 B1 | 2/2002 | Smith |
| 6,387,052 B1 | 5/2002 | Quinn |
| 6,410,971 B1 | 6/2002 | Otey |
| 6,421,016 B1 | 7/2002 | Phillips |
| 6,450,026 B1 | 9/2002 | Desarnaud |
| 6,455,931 B1 | 9/2002 | Hamilton |
| 6,567,158 B1 | 5/2003 | Falcial |
| 6,626,940 B2 | 9/2003 | Crowley |
| 6,628,987 B1 | 9/2003 | Hill |
| 6,641,860 B1 | 11/2003 | Kaiserman |
| 6,775,906 B1 | 8/2004 | Silverbrook |
| 6,784,844 B1 | 8/2004 | Boakes |
| 6,965,160 B2 | 11/2005 | Cobbley |
| 6,987,314 B1 | 1/2006 | Yoshida |
| 7,259,030 B2 | 8/2007 | Daniels |
| 7,265,298 B2 | 9/2007 | Maghribi |
| 7,302,751 B2 | 12/2007 | Hamburgen |
| 7,337,012 B2 | 2/2008 | Maghribi |
| 7,487,587 B2 | 2/2009 | Vanfleteren |
| 7,491,892 B2 | 2/2009 | Wagner |
| 7,521,292 B2 | 4/2009 | Rogers |
| 7,557,367 B2 | 7/2009 | Rogers |
| 7,618,260 B2 | 11/2009 | Daniel |
| 7,622,367 B1 | 11/2009 | Nuzzo |
| 7,727,228 B2 | 6/2010 | Abboud |
| 7,739,791 B2 | 6/2010 | Brandenburg |
| 7,759,167 B2 | 7/2010 | Vanfleteren |
| 7,815,095 B2 | 10/2010 | Fujisawa |
| 7,960,246 B2 | 6/2011 | Flamand |
| 7,982,296 B2 | 7/2011 | Nuzzo |
| 8,097,926 B2 | 1/2012 | De Graff |
| 8,198,621 B2 | 6/2012 | Rogers |
| 8,207,473 B2 | 6/2012 | Axisa |
| 8,217,381 B2 | 7/2012 | Rogers |
| 8,332,053 B1 | 12/2012 | Patterson |
| 8,372,726 B2 | 2/2013 | De Graff |
| 8,389,862 B2 | 3/2013 | Arora |
| 8,431,828 B2 | 4/2013 | Vanfleteren |
| 8,440,546 B2 | 5/2013 | Nuzzo |
| 8,536,667 B2 | 9/2013 | De Graff |
| 8,552,299 B2 | 10/2013 | Rogers |
| 8,618,656 B2 | 12/2013 | Oh |
| 8,664,699 B2 | 3/2014 | Nuzzo |
| 8,679,888 B2 | 3/2014 | Rogers |
| 8,729,524 B2 | 5/2014 | Rogers |
| 8,754,396 B2 | 6/2014 | Rogers |
| 8,865,489 B2 | 10/2014 | Rogers |
| 8,886,334 B2 | 11/2014 | Ghaffari |
| 8,905,772 B2 | 12/2014 | Rogers |
| 9,012,784 B2 | 4/2015 | Arora |
| 9,082,025 B2 | 7/2015 | Fastert |
| 9,105,555 B2 | 8/2015 | Rogers |
| 9,105,782 B2 | 8/2015 | Rogers |
| 9,119,533 B2 | 9/2015 | Ghaffari |
| 9,123,614 B2 | 9/2015 | Graff |
| 9,159,635 B2 | 10/2015 | Elolampi |
| 9,168,094 B2 | 10/2015 | Lee |
| 9,171,794 B2 | 10/2015 | Rafferty |
| 9,186,060 B2 | 11/2015 | De Graff |
| 9,226,402 B2 | 12/2015 | Hsu |
| 9,247,637 B2 | 1/2016 | Hsu |
| 9,289,132 B2 | 3/2016 | Ghaffari |
| 9,295,842 B2 | 3/2016 | Ghaffari |
| 9,320,907 B2 | 4/2016 | Bogie |
| 9,324,733 B2 | 4/2016 | Rogers |
| 9,372,123 B2 | 6/2016 | Li |
| 9,408,305 B2 | 8/2016 | Hsu |
| 9,515,025 B2 | 12/2016 | Rogers |
| 9,516,758 B2 | 12/2016 | Arora |
| 9,545,216 B2 | 1/2017 | D'Angelo |
| 9,545,285 B2 | 1/2017 | Ghaffari |
| 9,554,850 B2 | 1/2017 | Lee |
| 9,579,040 B2 | 2/2017 | Rafferty |
| 9,583,428 B2 | 2/2017 | Rafferty |
| 9,881,512 B2* | 1/2018 | Jeyanandarajan ....... G09B 7/08 |
| 2001/0012918 A1 | 8/2001 | Swanson |
| 2001/0021867 A1 | 9/2001 | Kordis |
| 2002/0000813 A1 | 1/2002 | Hirono |
| 2002/0026127 A1 | 2/2002 | Balbierz |
| 2002/0082515 A1 | 6/2002 | Campbell |
| 2002/0094701 A1 | 7/2002 | Biegelsen |
| 2002/0113739 A1 | 8/2002 | Howard |
| 2002/0128700 A1 | 9/2002 | Cross, Jr. |
| 2002/0145467 A1 | 10/2002 | Minch |
| 2002/0151934 A1 | 10/2002 | Levine |
| 2002/0158330 A1 | 10/2002 | Moon |
| 2002/0173730 A1 | 11/2002 | Pottgen |
| 2002/0193724 A1 | 12/2002 | Stebbings |
| 2003/0017848 A1 | 1/2003 | Engstrom |
| 2003/0045025 A1 | 3/2003 | Coyle |
| 2003/0097165 A1 | 5/2003 | Krulevitch |
| 2003/0120271 A1 | 6/2003 | Burnside |
| 2003/0162507 A1 | 8/2003 | Vatt |
| 2003/0214408 A1 | 11/2003 | Grajales |
| 2003/0236455 A1 | 12/2003 | Swanson |
| 2004/0006264 A1 | 1/2004 | Mojarradi |
| 2004/0085469 A1 | 5/2004 | Johnson |
| 2004/0092806 A1 | 5/2004 | Sagon |
| 2004/0106334 A1 | 6/2004 | Suzuki |
| 2004/0118831 A1 | 6/2004 | Martin |
| 2004/0135094 A1 | 7/2004 | Niigaki |
| 2004/0138558 A1 | 7/2004 | Dunki-Jacobs |
| 2004/0149921 A1 | 8/2004 | Smyk |
| 2004/0178466 A1 | 9/2004 | Merrill |
| 2004/0192082 A1 | 9/2004 | Wagner |
| 2004/0201134 A1 | 10/2004 | Kawai |
| 2004/0203486 A1 | 10/2004 | Shepherd |

(56) References Cited

U.S. PATENT DOCUMENTS

| | | |
|---|---|---|
| 2004/0221370 A1 | 11/2004 | Hannula |
| 2004/0243204 A1 | 12/2004 | Maghribi |
| 2005/0021103 A1 | 1/2005 | DiLorenzo |
| 2005/0029680 A1 | 2/2005 | Jung |
| 2005/0067293 A1 | 3/2005 | Naito |
| 2005/0070778 A1 | 3/2005 | Lackey |
| 2005/0096513 A1 | 5/2005 | Ozguz |
| 2005/0113167 A1* | 5/2005 | Buchner ............... A63F 13/02 463/30 |
| 2005/0113744 A1 | 5/2005 | Donoghue |
| 2005/0139683 A1 | 6/2005 | Yi |
| 2005/0171524 A1 | 8/2005 | Stern |
| 2005/0203366 A1 | 9/2005 | Donoghue |
| 2005/0248312 A1 | 11/2005 | Cao |
| 2005/0261617 A1 | 11/2005 | Hall |
| 2005/0258050 A1 | 12/2005 | Bruce |
| 2005/0285262 A1 | 12/2005 | Knapp |
| 2006/0003709 A1 | 1/2006 | Wood |
| 2006/0038182 A1 | 2/2006 | Rogers |
| 2006/0071349 A1 | 4/2006 | Tokushige |
| 2006/0084394 A1 | 4/2006 | Engstrom |
| 2006/0106321 A1 | 5/2006 | Lewinsky |
| 2006/0122298 A1 | 6/2006 | Menon |
| 2006/0128346 A1 | 6/2006 | Yasui |
| 2006/0154398 A1 | 7/2006 | Qing |
| 2006/0160560 A1 | 7/2006 | Josenhans |
| 2006/0248946 A1 | 11/2006 | Howell |
| 2006/0257945 A1 | 11/2006 | Masters |
| 2006/0264767 A1 | 11/2006 | Shennib |
| 2006/0270135 A1 | 11/2006 | Chrysler |
| 2006/0286785 A1 | 12/2006 | Rogers |
| 2007/0027514 A1 | 2/2007 | Gerber |
| 2007/0031283 A1 | 2/2007 | Davis |
| 2007/0108389 A1 | 5/2007 | Makela |
| 2007/0113399 A1 | 5/2007 | Kumar |
| 2007/0123756 A1 | 5/2007 | Kitajima |
| 2007/0139451 A1 | 6/2007 | Somasiri |
| 2007/0179373 A1 | 8/2007 | Pronovost |
| 2007/0190880 A1 | 8/2007 | Dubrow |
| 2007/0270672 A1 | 11/2007 | Hayter |
| 2007/0270674 A1 | 11/2007 | Kane |
| 2008/0036097 A1 | 2/2008 | Ito |
| 2008/0046080 A1 | 2/2008 | Vanden Bulcke |
| 2008/0074383 A1 | 3/2008 | Dean |
| 2008/0096620 A1 | 4/2008 | Lee |
| 2008/0139894 A1 | 6/2008 | Szydlo-Moore |
| 2008/0157235 A1 | 7/2008 | Rogers |
| 2008/0185534 A1 | 8/2008 | Simon |
| 2008/0188912 A1 | 8/2008 | Stone |
| 2008/0193749 A1 | 8/2008 | Thompson |
| 2008/0200973 A1 | 8/2008 | Mallozzi |
| 2008/0204021 A1 | 8/2008 | Leussler |
| 2008/0211087 A1 | 9/2008 | Mueller-Hipper |
| 2008/0237840 A1 | 10/2008 | Alcoe |
| 2008/0259576 A1 | 10/2008 | Johnson |
| 2008/0262381 A1 | 10/2008 | Kolen |
| 2008/0287167 A1 | 11/2008 | Caine |
| 2008/0313552 A1 | 12/2008 | Buehler |
| 2009/0000377 A1 | 1/2009 | Shipps |
| 2009/0001550 A1 | 1/2009 | Li |
| 2009/0015560 A1 | 1/2009 | Robinson |
| 2009/0017884 A1 | 1/2009 | Rotschild |
| 2009/0048556 A1 | 2/2009 | Durand |
| 2009/0076363 A1 | 3/2009 | Bly |
| 2009/0088750 A1 | 4/2009 | Hushka |
| 2009/0107704 A1 | 4/2009 | Vanfleteren |
| 2009/0154736 A1 | 6/2009 | Lee |
| 2009/0184254 A1 | 7/2009 | Miura |
| 2009/0204168 A1 | 8/2009 | Kallmeyer |
| 2009/0215385 A1 | 8/2009 | Waters |
| 2009/0225751 A1 | 9/2009 | Koenck |
| 2009/0261828 A1 | 10/2009 | Nordmeyer-Massner |
| 2009/0270170 A1* | 10/2009 | Patton ............... A63F 13/10 463/36 |
| 2009/0273909 A1 | 11/2009 | Shin |
| 2009/0283891 A1 | 11/2009 | Dekker |
| 2009/0291508 A1 | 11/2009 | Babu |
| 2009/0294803 A1 | 12/2009 | Nuzzo |
| 2009/0322480 A1 | 12/2009 | Benedict |
| 2010/0002402 A1 | 1/2010 | Rogers |
| 2010/0030167 A1 | 2/2010 | Thirstrup |
| 2010/0059863 A1 | 3/2010 | Rogers |
| 2010/0072577 A1 | 3/2010 | Nuzzo |
| 2010/0073669 A1 | 3/2010 | Colvin |
| 2010/0087782 A1 | 4/2010 | Ghaffari |
| 2010/0090781 A1 | 4/2010 | Yamamoto |
| 2010/0090824 A1 | 4/2010 | Rowell |
| 2010/0116526 A1 | 5/2010 | Arora |
| 2010/0117660 A1 | 5/2010 | Douglas |
| 2010/0178722 A1 | 7/2010 | De Graff |
| 2010/0245011 A1 | 9/2010 | Chatzopoulos |
| 2010/0271191 A1 | 10/2010 | De Graff |
| 2010/0298895 A1 | 11/2010 | Ghaffari |
| 2010/0317132 A1 | 12/2010 | Rogers |
| 2010/0321161 A1 | 12/2010 | Isabell |
| 2010/0327387 A1 | 12/2010 | Kasai |
| 2011/0011179 A1 | 1/2011 | Gustafsson |
| 2011/0034760 A1 | 2/2011 | Brynelsen |
| 2011/0034912 A1 | 2/2011 | De Graff |
| 2011/0051384 A1 | 3/2011 | Kriechbaum |
| 2011/0054583 A1 | 3/2011 | Litt |
| 2011/0071603 A1 | 3/2011 | Moore |
| 2011/0098583 A1 | 4/2011 | Pandia |
| 2011/0101789 A1 | 5/2011 | Salter |
| 2011/0121822 A1 | 5/2011 | Parsche |
| 2011/0140856 A1 | 6/2011 | Downie |
| 2011/0140897 A1 | 6/2011 | Purks |
| 2011/0175735 A1 | 7/2011 | Forster |
| 2011/0184320 A1 | 7/2011 | Shipps |
| 2011/0185611 A1 | 8/2011 | Adams |
| 2011/0213559 A1 | 9/2011 | Pollack |
| 2011/0215931 A1 | 9/2011 | Callsen |
| 2011/0218756 A1 | 9/2011 | Callsen |
| 2011/0218757 A1 | 9/2011 | Callsen |
| 2011/0220890 A1 | 9/2011 | Nuzzo |
| 2011/0222375 A1 | 9/2011 | Tsubata |
| 2011/0244959 A1* | 10/2011 | Inagaki ............... G06F 3/017 463/31 |
| 2011/0263950 A1 | 10/2011 | Larson |
| 2011/0277813 A1 | 11/2011 | Rogers |
| 2011/0284268 A1 | 11/2011 | Palaniswamy |
| 2001/0317737 | 12/2011 | Klewer |
| 2011/0306851 A1 | 12/2011 | Wang |
| 2012/0016258 A1 | 1/2012 | Webster |
| 2012/0051005 A1 | 3/2012 | Vanfleteren |
| 2012/0052268 A1 | 3/2012 | Axisa |
| 2012/0065937 A1 | 3/2012 | De Graff |
| 2012/0074546 A1 | 3/2012 | Chong |
| 2012/0087216 A1 | 4/2012 | Keung |
| 2012/0091594 A1 | 4/2012 | Landesberger |
| 2012/0092178 A1 | 4/2012 | Callsen |
| 2012/0092222 A1 | 4/2012 | Kato |
| 2012/0101413 A1 | 4/2012 | Beetel |
| 2012/0101538 A1 | 4/2012 | Ballakur |
| 2012/0108012 A1 | 5/2012 | Yasuda |
| 2012/0126418 A1 | 5/2012 | Feng |
| 2012/0150072 A1 | 6/2012 | Revol-Cavalier |
| 2012/0157804 A1 | 6/2012 | Rogers |
| 2012/0172697 A1 | 7/2012 | Urman |
| 2012/0178367 A1 | 7/2012 | Matsumoto |
| 2012/0226130 A1 | 9/2012 | De Graff |
| 2012/0242800 A1* | 9/2012 | Ionescu ............... G06F 3/017 348/46 |
| 2012/0244848 A1 | 9/2012 | Ghaffari |
| 2012/0256308 A1 | 10/2012 | Helin |
| 2012/0316455 A1 | 12/2012 | Rahman |
| 2012/0327608 A1 | 12/2012 | Rogers |
| 2013/0041235 A1 | 2/2013 | Rogers |
| 2013/0044215 A1 | 2/2013 | Rothkopf |
| 2013/0085552 A1 | 4/2013 | Mandel |
| 2013/0099358 A1 | 4/2013 | Elolampi |
| 2013/0100618 A1 | 4/2013 | Rogers |
| 2013/0116520 A1 | 5/2013 | Roham |
| 2013/0118255 A1 | 5/2013 | Callsen |

(56) References Cited

U.S. PATENT DOCUMENTS

| | | |
|---|---|---|
| 2013/0123587 A1 | 5/2013 | Sarrafzadeh |
| 2013/0128022 A1* | 5/2013 | Bose .................... H04N 7/18 |
| | | 348/77 |
| 2013/0150693 A1 | 6/2013 | D'angelo |
| 2013/0185003 A1 | 7/2013 | Carbeck |
| 2013/0192356 A1 | 8/2013 | De Graff |
| 2013/0197319 A1 | 8/2013 | Monty |
| 2013/0200268 A1 | 8/2013 | Rafferty |
| 2013/0211761 A1 | 8/2013 | Brandsma |
| 2013/0214300 A1 | 8/2013 | Lerman |
| 2013/0215467 A1 | 8/2013 | Fein |
| 2013/0225965 A1 | 8/2013 | Ghaffari |
| 2013/0237150 A1 | 9/2013 | Royston |
| 2013/0245388 A1 | 9/2013 | Rafferty |
| 2013/0253285 A1 | 9/2013 | Bly |
| 2013/0274562 A1 | 10/2013 | Ghaffari |
| 2013/0278631 A1* | 10/2013 | Border ............... G02B 27/017 |
| | | 345/633 |
| 2013/0313713 A1 | 11/2013 | Arora |
| 2013/0316442 A1 | 11/2013 | Meurville |
| 2013/0316487 A1 | 11/2013 | De Graff |
| 2013/0316645 A1 | 11/2013 | Li |
| 2013/0320503 A1 | 12/2013 | Nuzzo |
| 2013/0321373 A1 | 12/2013 | Yoshizumi |
| 2013/0328219 A1 | 12/2013 | Chau |
| 2013/0331914 A1 | 12/2013 | Lee |
| 2014/0001058 A1 | 1/2014 | Ghaffari |
| 2014/0004951 A1* | 1/2014 | Kern .................... A63F 13/86 |
| | | 463/42 |
| 2014/0012160 A1 | 1/2014 | Ghaffari |
| 2014/0012242 A1 | 1/2014 | Lee |
| 2014/0022746 A1 | 1/2014 | Hsu |
| 2014/0039290 A1 | 2/2014 | De Graff |
| 2014/0097944 A1 | 4/2014 | Fastert |
| 2014/0110859 A1 | 4/2014 | Rafferty |
| 2014/0125458 A1 | 5/2014 | Bachman |
| 2014/0140020 A1 | 5/2014 | Rogers |
| 2014/0188426 A1 | 7/2014 | Fastert |
| 2014/0191236 A1 | 7/2014 | Nuzzo |
| 2014/0206976 A1 | 7/2014 | Thompson |
| 2014/0216524 A1 | 8/2014 | Rogers |
| 2014/0240932 A1 | 8/2014 | Hsu |
| 2014/0249520 A1 | 9/2014 | Ghaffari |
| 2014/0303452 A1 | 10/2014 | Ghaffari |
| 2014/0303680 A1 | 10/2014 | Donnelly |
| 2014/0308930 A1 | 10/2014 | Tran |
| 2014/0340857 A1 | 11/2014 | Hsu |
| 2014/0371547 A1 | 12/2014 | Gartenberg |
| 2014/0374872 A1 | 12/2014 | Rogers |
| 2014/0375465 A1 | 12/2014 | Fenuccio |
| 2015/0001462 A1 | 1/2015 | Rogers |
| 2015/0019135 A1 | 1/2015 | Kacyvenski |
| 2015/0025394 A1 | 1/2015 | Hong |
| 2015/0035680 A1 | 2/2015 | Li |
| 2015/0069617 A1 | 3/2015 | Arora |
| 2015/0099976 A1 | 4/2015 | Ghaffari |
| 2015/0100135 A1 | 4/2015 | Ives |
| 2015/0145676 A1* | 5/2015 | Adhikari ............... A61B 5/1112 |
| | | 340/539.32 |
| 2015/0194817 A1 | 7/2015 | Lee |
| 2015/0237711 A1 | 8/2015 | Rogers |
| 2015/0241288 A1 | 8/2015 | Keen |
| 2015/0260713 A1 | 9/2015 | Ghaffari |
| 2015/0272652 A1 | 10/2015 | Ghaffari |
| 2015/0286913 A1 | 10/2015 | Fastert |
| 2015/0309563 A1* | 10/2015 | Connor .................. G06F 3/011 |
| | | 73/865.4 |
| 2015/0320472 A1 | 11/2015 | Ghaffari |
| 2015/0335254 A1 | 11/2015 | Fastert |
| 2015/0342036 A1 | 11/2015 | Elolampi |
| 2016/0015962 A1 | 1/2016 | Shokoueinejad Maragheh |
| 2016/0027834 A1 | 1/2016 | de Graff |
| 2016/0045162 A1 | 2/2016 | De Graff |
| 2016/0063883 A1* | 3/2016 | Jeyanandarajan ....... G09B 7/08 |
| | | 434/201 |
| 2016/0081192 A1 | 3/2016 | Hsu |
| 2016/0086909 A1 | 3/2016 | Garlock |
| 2016/0095652 A1 | 4/2016 | Lee |
| 2016/0099214 A1 | 4/2016 | Dalal |
| 2016/0099227 A1 | 4/2016 | Dalal |
| 2016/0111353 A1 | 4/2016 | Rafferty |
| 2016/0135740 A1 | 5/2016 | Ghaffari |
| 2016/0178251 A1 | 6/2016 | Johnson |
| 2016/0202755 A1* | 7/2016 | Connor ................. A61B 5/1126 |
| | | 73/865.4 |
| 2016/0213262 A1 | 7/2016 | Ghaffari |
| 2016/0213424 A1 | 7/2016 | Ghaffari |
| 2016/0228640 A1 | 8/2016 | Pindado |
| 2016/0228771 A1* | 8/2016 | Watson .................. G06F 3/013 |
| 2016/0232807 A1 | 8/2016 | Ghaffari |
| 2016/0240061 A1 | 8/2016 | Li |
| 2016/0249174 A1 | 8/2016 | Patel |
| 2016/0256070 A1 | 9/2016 | Murphy |
| 2016/0287177 A1 | 10/2016 | Huppert |
| 2016/0293794 A1 | 10/2016 | Nuzzo |
| 2016/0309594 A1 | 10/2016 | Hsu |
| 2016/0322283 A1 | 11/2016 | McMahon |
| 2016/0338646 A1 | 11/2016 | Lee |
| 2016/0361015 A1 | 12/2016 | Wang |
| 2016/0371957 A1 | 12/2016 | Ghaffari |
| 2016/0381789 A1 | 12/2016 | Rogers |
| 2017/0019988 A1 | 1/2017 | McGrane |
| 2017/0049397 A1 | 2/2017 | Sun |

FOREIGN PATENT DOCUMENTS

| | | |
|---|---|---|
| EP | 0585670 A2 | 3/1994 |
| EP | 0779059 A1 | 6/1997 |
| EP | 1808124 A2 | 7/2007 |
| EP | 2259062 A2 | 12/2010 |
| JP | 05-087511 A | 4/1993 |
| JP | 2005-052212 A | 3/2005 |
| JP | 2009-170173 A | 7/2009 |
| WO | WO 1999/038211 A2 | 7/1999 |
| WO | WO 2003/021679 A2 | 3/2003 |
| WO | WO 2005/083546 A1 | 9/2005 |
| WO | WO 2005/122285 A2 | 12/2005 |
| WO | WO 2007/003019 A2 | 1/2007 |
| WO | WO 2007/024983 A2 | 3/2007 |
| WO | WO 2007/116344 A1 | 10/2007 |
| WO | WO 2007/136726 A2 | 11/2007 |
| WO | WO 2008/030960 A2 | 3/2008 |
| WO | WO 2009/111641 A1 | 9/2009 |
| WO | WO 2009/114689 A1 | 9/2009 |
| WO | WO 2010/036807 A1 | 4/2010 |
| WO | WO 2010/042653 A1 | 4/2010 |
| WO | WO 2010/042957 A2 | 4/2010 |
| WO | WO 2010/046883 A1 | 4/2010 |
| WO | WO 2010/056857 A2 | 5/2010 |
| WO | WO 2010/081137 A2 | 7/2010 |
| WO | WO 2010/082993 A2 | 7/2010 |
| WO | WO 2010/102310 A2 | 9/2010 |
| WO | WO 2010/132552 A1 | 11/2010 |
| WO | WO 2011/003181 A1 | 1/2011 |
| WO | WO 2011/041727 A1 | 4/2011 |
| WO | WO 2011/084450 A1 | 7/2011 |
| WO | WO 2011/084709 A2 | 7/2011 |
| WO | WO 2011/124898 A1 | 10/2011 |
| WO | WO 2011/127331 A2 | 10/2011 |
| WO | WO 2012/125494 A2 | 9/2012 |
| WO | WO 2012/166686 A2 | 12/2012 |
| WO | WO 2013/010171 A1 | 1/2013 |
| WO | WO 2013/022853 A1 | 2/2013 |
| WO | WO 2013/033724 A1 | 3/2013 |
| WO | WO 2013/034987 A3 | 3/2013 |
| WO | WO 2013/049716 A1 | 4/2013 |
| WO | WO 2013/052919 A2 | 4/2013 |
| WO | WO 2013/170032 A2 | 11/2013 |
| WO | WO 2014/007871 A1 | 1/2014 |
| WO | WO 2014/058473 A1 | 4/2014 |
| WO | WO 2014/059032 A1 | 4/2014 |
| WO | WO 2014/106041 A1 | 7/2014 |

(56) References Cited

FOREIGN PATENT DOCUMENTS

| WO | WO 2014/110176 A1 | 7/2014 |
|---|---|---|
| WO | WO 2014/130928 A2 | 8/2014 |
| WO | WO 2014/130931 A1 | 8/2014 |
| WO | WO 2014/186467 A2 | 11/2014 |
| WO | WO 2014/197443 A1 | 12/2014 |
| WO | WO 2014/205434 A2 | 12/2014 |
| WO | WO 2015/021039 A1 | 2/2015 |
| WO | WO 2015/054312 A1 | 4/2015 |
| WO | WO 2015/077559 A1 | 5/2015 |
| WO | WO 2015/080991 A1 | 6/2015 |
| WO | WO 2015/102951 A2 | 7/2015 |
| WO | WO 2015/103483 A1 | 7/2015 |
| WO | WO 2015/103580 A2 | 7/2015 |
| WO | WO 2015/127458 A1 | 8/2015 |
| WO | WO 2015/134588 A1 | 9/2015 |
| WO | WO 2015/138712 A1 | 9/2015 |
| WO | WO 2015/145471 A1 | 10/2015 |
| WO | WO 2016/048888 A1 | 3/2016 |
| WO | WO 2016/054512 A1 | 4/2016 |
| WO | WO 2016/057318 A1 | 4/2016 |
| WO | WO 2016/081244 A1 | 5/2016 |
| WO | WO 2016/0127050 A1 | 8/2016 |
| WO | WO 2016/134306 A1 | 8/2016 |
| WO | WO 2016-140961 A1 | 9/2016 |
| WO | WO 2016/205385 A1 | 12/2016 |
| WO | WO 2017/015000 A1 | 1/2017 |

OTHER PUBLICATIONS

Demura er al., "Immobilization of Glucose Oxidase with *Bombyx mori* Silk Fibroin by Only Stretching Treatment and its Application to Glucose Sensor," Biotechnology and Bioengineering, vol. 33, 598-603 (6 pages) (1989).

Ellerbee et al., "Quantifying Colorimetric Assays in Paper-Based Microfluidic Devices by Measuring the Transmission of Light through Paper," Analytical Chemistry, vol. 81, No. 20 8447-8452, (6 pages) (Oct. 15, 2009).

Halsted, "Ligature and Suture Material," Journal of the American Medical Association, vol. LX, No. 15, 1119-1126, (8 pages) (Apr. 12, 1913).

Kim et al., "Complementary Metal Oxide Silicon Integrated Circuits Incorporating Monolithically Integrated Stretchable Wavy Interconnects," Applied Physics Letters, vol. 93, 044102-044102.3 (3 pages) (Jul. 31, 2008).

Kim et al., "Dissolvable Films of Silk Fibroin for Ultrathin Conformal Bio-Integrated Electronics," Nature, 1-8 (8 pages) (Apr. 18, 2010).

Kim et al., "Materials and Noncoplanar Mesh Designs for Integrated Circuits with Linear Elastic Responses to Extreme Mechanical Deformations," PNAS, vol. 105, No. 48, 18675-18680 (6 pages) (Dec. 2, 2008).

Kim et al., "Stretchable and Foldable Silicon Integrated Circuits," Science, vol. 320, 507-511 (5 pages) (Apr. 25, 2008).

Kim et al., "Electrowetting on Paper for Electronic Paper Display," ACS Applied Materials & Interfaces, vol. 2, No. 11, (3318-3323) (6 pages) (Nov. 24, 2010).

Ko et al., "A Hemispherical Electronic Eye Camera Based on Compressible Silicon Optoelectronics," Nature, vol. 454, 748-753 (6 pages) (Aug. 7, 2008).

Lawrence et al., "Bioactive Silk Protein Biomaterial Systems for Optical Devices," Biomacromolecules, vol. 9, 1214-1220 (7 pages) (Nov. 4, 2008).

Meitl et al., "Transfer Printing by Kinetic Control of Adhesion to an Elastomeric Stamp," Nature, vol. 5, 33-38 (6 pages) (Jan. 2006).

Omenetto et al., "A New Route for Silk," Nature Photonics, vol. 2, 641-643 (3 pages) (Nov. 2008).

Omenetto et al., "New Opportunities for an Ancient Material," Science, vol. 329, 528-531 (5 pages) (Jul. 30, 2010).

Siegel et al., "Foldable Printed Circuit Boards on Paper Substrates," Advanced Functional Materials, vol. 20, No. 1, 28-35, (8 pages) (Jan. 8, 2010).

Tsukada et al., "Structural Changes of Silk Fibroin Membranes Induced by Immersion in Methanol Aqueous Solutions," Journal of Polymer Science, vol. 32, 961-968 (8 pages) (1994).

Wang et al., "Controlled Release From Multilayer Silk Biomaterial Coatings to Modulate Vascular Cell Responses" Biomaterials, 29, 894-903 (10 pages) (Nov. 28, 2008).

Wikipedia, "Ball bonding" article [online]. Cited in PCT/US2015/051210 search report dated Mar. 1, 2016 with the following information "Jun. 15, 2011 [retrieved on Nov. 15, 2015}. Retrieved Dec. 2018, 29 from the Internet: <URL: https:////web.archive.org/web/20110615221003/hltp://en.wikipedia.org/wiki/Ball_bonding>., entire document, especially para 1, 4, 5, 6," 2 pages, last page says ("last modified on May 11, 2011").

Bossuyt et al., "Stretchable Electronics for Large Area Applications: Fabrication and Mechanical Characterizations", vol. 3, pp. 229-235 (7 pages) (Feb. 2013).

Jones et al., "Stretchable Interconnects for Elastic Electronic Surfaces". vol. 93, pp. 1459-1467 (9 pages) (Aug. 2005).

Lin et al., "Design and Fabrication of Large-Area, Redundant, Stretchable Interconnect Meshes Using Excimer Laser Photoablation and In Situ Masking", (10 pages) (Aug. 2010).

Kim et al., "A Biaxial Stretchable Interconnect With Liquid-Alloy-Covered Joints on Elastomeric Substrate", vol. 18, pp. 138-146 (9 pages) (Feb. 2009).

\* cited by examiner

METHOD AND SYSTEM FOR INTERACTING WITH A VIRTUAL ENVIRONMENT

CROSS-REFERENCE TO RELATED APPLICATIONS

This application claims any and all benefits as provided by law including benefit under 35 U.S.C. § 119(e) of the U.S. Provisional Application No. 62/235,793, filed Oct. 1, 2015, the contents of which are incorporated herein by reference in its entirety

STATEMENT REGARDING FEDERALLY SPONSORED RESEARCH

Not Applicable

REFERENCE TO MICROFICHE APPENDIX

Not Applicable

BACKGROUND

Technical Field of the Invention

The present invention is directed to methods and systems for monitoring physical, physiologic and/or biologic information about one or more persons or subjects and using physical, physiologic and/or biologic information or information derived from physical, physiologic and/or biologic information, to interact with virtual environments and associated systems and devices. More specifically, the system can include one or more sensors that detect a condition of one or more persons or subjects and use that information to change the operation of a system a gaming system or virtual reality system.

Description of the Prior Art

Many existing gaming consoles include remote controls and motion capture cameras with onboard motion tracking algorithms to track the motion of participants however, these controls are limited in their ability to tracking body movements. For example, the Xbox360 camera senses body movements based on optical detection. Depending on the position of the user, the motion detection algorithms have a difficult time seeing all limb movements, especially if there are differences in limb-depth with respect to the optical sensor. Furthermore, response times are slow. The remotes for the Wii and other related consoles typically include gyroscopes and accelerometers built in.

Oculus Rift is known for having limitations when users are climbing stairs or maintaining balance. The brain must be tricked into thinking that it is climbing, when the movement on your body is not actually happening. The Oculus rift has no way to sense whether the user is feeling off-balanced during these virtual scenarios.

SUMMARY

The present invention is directed to methods and systems that are adapted to sense physiologic or biometric information from one or more participants in a virtual environment (e.g., a video gaming environment, augmented reality environment or a virtual reality environment) and use the physiologic or biometric information (or information derived from the physiologic information) to modify the virtual environment, for example, to enhance the user experience or to customize the virtual environment for the user.

In accordance with some embodiments, the system can include body worn sensors that can sense physiologic information such as heart rate, EMG, EKG, EEG, respiration, perspiration, galvanic skin response (GSR), posture, gait, and motion, and send this information to a virtual environment controller, such as a gaming console, to provide an additional level of input to software that drives the video game or virtual environment. In addition, the body worn sensor can include smart sensors that process the physiologic and/or biometric information to derive other metrics such as emotional state, stress levels, anxiety and fatigue, and send this information to the gaming console, as well. The gaming console can use the physiologic and/or biometric information and/or the derived metrics to change the atmosphere, level of difficulty, dialogue, video action, and other aspects of the audio and/or video presentation to customize the virtual environment for the user. This information can also be used to provide a safe operating environment, by shutting down the system console if one or more of the sensors indicate a potentially unsafe condition of the user, such as their heart rate or respiration exceeding a threshold or their EEG signals indicated unsafe brain activity, such as may lead to a seizure or a stroke.

The present invention is directed to methods for monitoring physical, physiologic and/or biologic conditions of a person or subject and using this information, either alone or in combination with other information, to influence or control, either directly or indirectly, one or more aspects of a virtual environment by sending this information to the system that controls the virtual environment, causing the system to change the way the virtual environment is presented to the user or the way the story (e.g., the audio and/or video presentation) flows at any given time.

In accordance with the invention, one or more people and/or subjects can be monitored by one or more sensing devices that indicate one or more conditions of some or all of the people and/or subjects. The conditions can include physical conditions, such as location and motion of the person or subject or a part of the person or subject. The conditions can include physiologic or biologic conditions, such as the mechanical, physical, thermal and/or biochemical aspects of functions and/or processes of the person or subject. The conditions can include mental, emotional, and psychiatric conditions, such as, mood, focus, concentration, depression, and alertness.

The sensed information about one or more persons or subjects can be collected and processed or analyzed and used as a direct input or used to select or modify an input to a virtual environment control system (e.g., a game console, virtual reality or augmented reality controller) that controls the virtual environment experienced by the person or subject. The virtual environment control system can include an application programming interface (API) that enables direct external inputs to control or influence one or more aspects of the virtual environment. The sensed information can also be used to modify the conventional inputs (e.g., game controllers, joysticks and other user interface devices) to change their response characteristics (e.g., response, latency, and/or amplitude) as a function of the sensed information or conditions.

The virtual environment control system can utilize one or more algorithms to determine whether to modify the environment or the operation of a system or machine. For example, the algorithm can use one or more parameters (or rates of change of those parameters) representative of one or more sensed conditions to influence or modify the operation of virtual environment control system. The software can, for example, change the storyline, the intensity of the graphics or the audio in response to changes in user stress levels (e.g., sensed conditions indicating increased or decreased stress levels, such as heart rate and respiration rates). In another example, the algorithm can compare one or more parameters representative of one or more sensed conditions to a predefined threshold value (or range) and based on the outcome of the comparison, take no further action or proceed to modify the virtual environment or the storyline presented in the virtual environment. In accordance with some embodiments, the video game can be made harder or easier, or the health of the participant's virtual representation (e.g., avatar) in the video game can change to conform more closely with the sensed conditions (e.g., if the participant appears to be fatigued and/or slow to react, the participant's virtual representation can exhibit a decline in health). Similarly, in some embodiments, the participant's virtual representation can exhibit the participant's movements (e.g., if the participant jumps, exhibits tremors or shaking, or even sneezes the virtual representation in the video game will present these movements as well).

In accordance with some embodiments of the invention, the system, according to the algorithm, can determine a trend or a rate of change of one or more parameters and use the rate of change to adjust the timing and/or flow of events in the virtual environment, such as, to build suspense or to make the game more enjoyable for the user.

In accordance with some embodiments of the invention, the sensors measure physiologic and/or biometric information that the user has little or no control over and can be analyzed to assess emotion and physiologic conditions that the user may not be aware of and have limited or no control over. This physiologic and/or biometric information provides one or more unique inputs to influence the control of the virtual environment control system.

These and other capabilities of the invention, along with the invention itself, will be more fully understood after a review of the following figures, detailed description, and claims.

BRIEF DESCRIPTION OF THE FIGURES

The accompanying drawings, which are incorporated into this specification, illustrate one or more exemplary embodiments of the inventions and, together with the detailed description, serve to explain the principles and applications of these inventions. The drawings and detailed description are illustrative, and are intended to facilitate an understanding of the inventions and their application without limiting the scope of the invention. The illustrative embodiments can be modified and adapted without departing from the spirit and scope of the inventions.

DETAILED DESCRIPTION OF PREFERRED EMBODIMENTS

The present invention is directed to systems and methods for modifying the operation or condition of one or more environments or systems as function of one or more sensed conditions of one or more people or subjects. In accordance with the invention, one or more people and/or subjects can be monitored by one or more sensing devices that can detect and indicate one or more conditions of some or all of the people and/or subjects. The conditions can include physical conditions, such as location and motion of the person or subject or a part of the person or subject. The conditions can include physiologic or biologic conditions, such as the mechanical, physical, thermal and/or biochemical aspects of the biologic and physiologic functions and/or processes of the person or subject. At least a portion of the sensed condition information can be displayed on a display.

In accordance with some embodiments of the invention, the sensed condition information can be used to modify the operation of the system (e.g., a device or set of devices), for example, to cause a computer program, function or process to be executed (e.g. started or stopped) or to change the flow of an executing program, function or process. In one example, a motion sensor (e.g., an accelerometer) can detect motion characteristics indicative of running or walking and as a result, the system could cause a step tracking computer program, function or process to be executed to count the number of steps taken and the distance traveled. In another example, the motion sensor (e.g., an accelerometer) can transmit the detected motion characteristics to a game console or virtual reality controller, which can make a virtual representation (e.g., avatar) in a virtual environment exhibit the same or exaggerated motion characteristics.

In accordance with some embodiments of the invention, the sensed condition information can be used to modify the operation of the system (e.g., a device or set of devices), for example, to cause other sensors to be activated so that their data can be used as part of newly started or an ongoing computer program, function or process for monitoring the person or subject. In one example, a temperature sensor could detect a rise in the person or subject' temperature (e.g., above threshold or steady state body temperature) and as a result, the system could activate sensors to detect heart rate (e.g., EKG) and/or respiration and as a result, begin to monitor heart rate and/or respiration as part of a newly started or ongoing user health monitoring program, function or process. Similarly, the rise in temperature above the designated threshold could trigger the virtual representation of the user to sweat in the virtual environment. In accordance with some embodiments of the invention, these sensed conditions can be used to control the operation game console or virtual reality controller 130.

Figure 1:
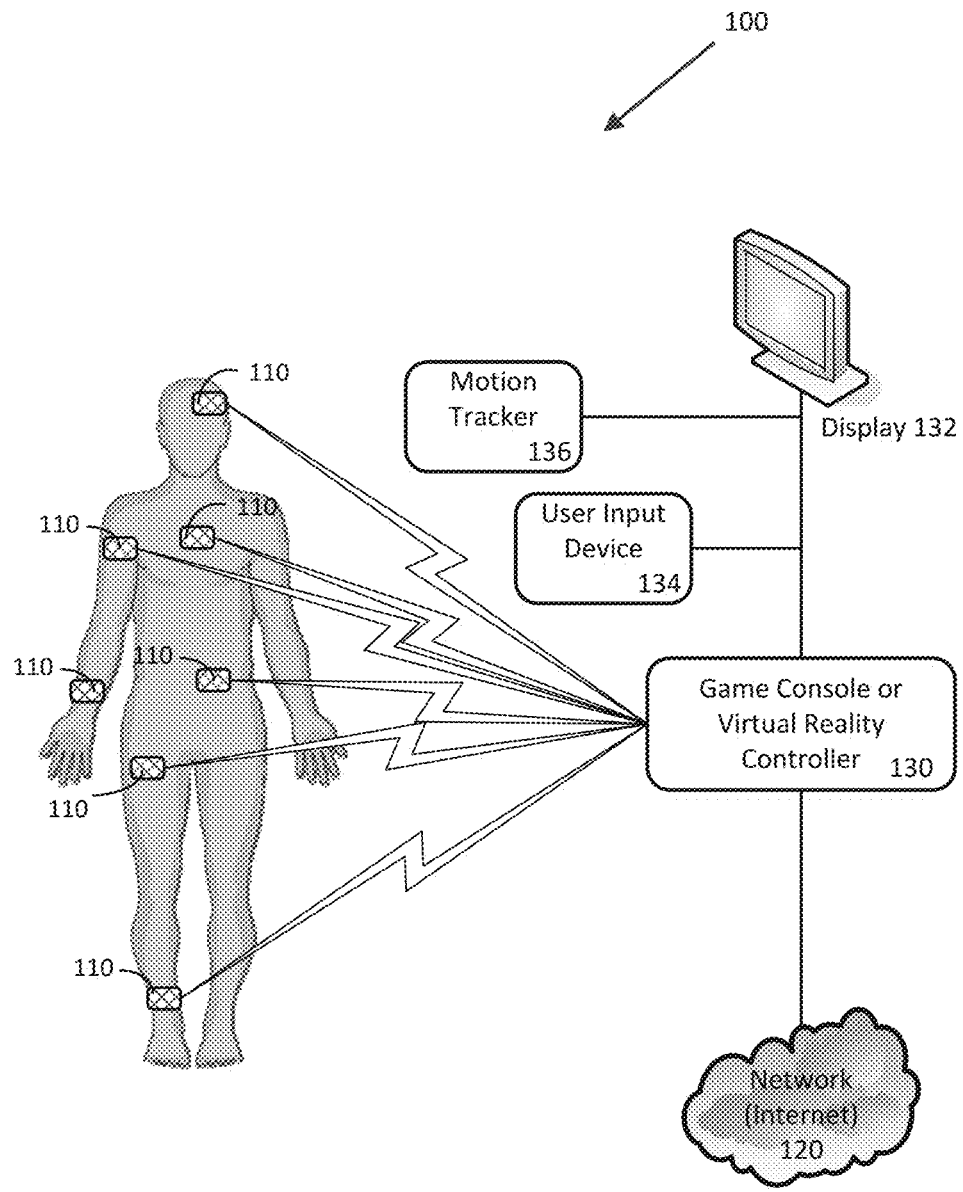
FIG. 1 is a block diagram of a system according to some embodiments of the invention.

FIG. 1 shows an example of a system 100 according to some embodiments of the invention. In this embodiment, the system 100 can include one or more sensing devices 110 and a game console or virtual reality controller 130. The system 100 can further comprise a network interface for optionally connecting the game console or virtual reality controller 130 to a network 120 such as the internet.

The sensing device 110 can be any device capable of detecting or measuring physical, physiologic or biologic functions and more than one sensing device can be included in the system 100. Each sensing device 110 can be configured with one or more controllers or microcontrollers, such as a low power system on a chip microcontroller, associated memory and a power source, such as a battery. The controller can be configured to run one or more digital signal processing algorithms and/or raw data signal processing algorithms. Each sensing device 110 can include one or more sensors such as accelerometers, gyroscopes, temperature sensors, light sensors (e.g., visible and invisible light), sound sensors, bio-potential electrodes (e.g., ECG, EMG, EEG), and other sensors. Each sensing device 110 can be configured to send sensor data to the game console or virtual reality controller 130. The sensor data can include raw sensor signal data, processed sensor signal data (e.g. filtered, scaled, segmented), signal features (e.g. dominant frequency, range, root mean square value) and algorithm output (e.g. fall detection alarm, tremor score, posture quality). The sensor data can include other information, such as metadata (e.g., information about the sensor device, the date, the time, the type and the scale or units of the sensor data).

Some examples of sensors and types of sensor data include, but are not limited to, dry and gel-enhanced electrodes and electrode arrays for measuring electrocardiogram waveforms, heart rate, heart rate variability, electromyography from distinct muscle groups (e.g. tibialis anterior muscle), electroencephalograms, electro-oculagrams. Strain gauges for measuring pulse waveforms from superficial arteries and respiration patterns. Piezoelectric sensors and actuators for mechanical energy harvesting and pulse waveform measurements. Temperature sensors, such as thermal couples and thermistors (for measuring core and skin surface temperature), optical sensors and/or photodetectors (for ultraviolet, visible light analysis, and/or colorimetry analysis), pH sensor, bioanalyte sensor (e.g. potassium, sodium, calcium, glucose, hormones, proteins), chemical/gas sensor (pollutants, deadly gases, mercury), microfluidic sensors for capturing and analyzing (e.g., composition and volume) skin secretions including perspiration and oils. In accordance with some embodiments of the invention, the sensing devices 110 can be adhered to the head, shoulders, arms, hands, torso, chest, legs and feet of the user. Other sensor data can include derivative sensor data derived (e.g., derivative data) from the raw sensor data over time or frequency.

The processed sensor data can be derived from the raw sensor data by various well known processes to remove noise or to characterize sets or units of raw sensor data (e.g., into features, tokens and/or messages). The sensing device 110 can include a processor and associated memory and execute one or more computer programs that collect sensor data on a periodic basis. The sensing device 110 can include a communication system that enables the raw sensor data or the processed sensor data to be transmitted to a remote device or system, such as the game console or virtual reality controller 130. The communication system can be adapted to provide wired or wireless communication with a remote device, such as the game console or virtual reality controller 130.

Each sensing device 110 can take many forms, including, for example, a flexible or stretchable conformable sensing device that can be adhered to the skin, a bracelet or strap that can be worn on the body, an article of clothing or a pad or plate that can be positioned against or adjacent the body. The sensing device 110 can detect and measure the physical motion of the person or subject. The sensing device 110 can detect and measure the posture or gait of the person or subject. The sensing device 110 can detect and measure temperature ambient environmental temperature as well as the temperature of the person or subject (e.g., core body and/or skin surface). The sensing device 110 can detect and measure the pulse, blood pressure, perspiration, galvanic skin response (GSR), and/or blood oxygen of the person or subject. The sensing device can detect and measure bio-potentials (e.g., EKG, EMG and EEG signals), strain, surface body temperature, core body temperature, salt concentrations in sweat, sweat loss rate, blood micronutrient levels, glucose concentration in sweat, visible/infrared/ultraviolet radiation, contact pressure, barometric pressure, skin strain, skin modulus, and generate images of sub-dermal structures using ultrasound transducers from the person or subject. The perspiration sensor can include the sensors disclosed in commonly owned U.S. Patent Application Ser. No. 62/127,124, filed on Mar. 2, 2015, entitled Perspiration Sensor, and U.S. patent application Ser. No. 15/057,762, filed on Mar. 1, 2016, entitled Perspiration Sensor, each of which is hereby incorporated by reference in its entirety.

The sensing device 110 can sample the output of one or more sensors on a periodic basis (e.g., at 1 Hz, 5 Hz, 10 Hz, 60 Hz, or more) and, if necessary, convert the signals into digital data. The digital data can be buffered, stored and/or streamed to one or more remote devices.

The game console or virtual reality controller 130 can include a processor and associated memory (e.g., volatile and non-volatile memory for storing programs and data). The processor can include at least one of a Central Processing Unit (CPU) and a Graphics Processing Unit (GPU). The game console or virtual reality controller 130 can be any known game console or virtual reality controller that can communicate with the sensing device 110. For example, the game console or virtual reality controller can be Nintendo GameCube®, Nintendo®'s Gameboy® Advance, Sony®'s PlayStation™ Console®, Nintendo®'s Wii™, and Microsoft®'s Xbox 360®, Dreamcast, or Oculus® console. The game console or virtual reality controller 130 can receive information from one or more sensing devices 110 and change its operation (e.g., change the atmosphere, level of difficulty, dialogue, video action, or other aspects of the video game) to modify the virtual environment for the user. In accordance with some embodiments, one or more sensing devices 110 can communicate with the game console or virtual reality controller 130 through an intermediate device such as a smart phone or other computing device 150.

In accordance with some embodiments of the invention, the game console or virtual reality controller 130 can be connected to a display 132, a user input device 134, and optionally a motion tracker 136. The game console or virtual reality controller 130 can transmit content (e.g., images or videos) to be presented on the display 132. The game console or virtual reality controller 130 can adjust the content (e.g., images or videos) presented on the display 132 as a function of the information received from one or more sensing device 110, user input device 134, and/or motion tracker 136.

The display 132 can be a computer screen, a TV screen, a projector screen, a head-mounted display, or wearable glasses.

In accordance with some embodiments of the invention, one or more user input devices 134 can be connected to the game console or virtual reality controller 130 through a game port or a Universal Serial Bus (USB) port. The user input device 134 can serve as an interface for a user to provide input to the game console or virtual reality controller 130. The user input device 134 can be a hand-held device that includes one or more buttons and/or triggers. By pressing the one or more buttons and/or triggers, input can be transmitted to the game console or virtual reality controller 130. The user input device 134 can also include a keyboard/keypad, a pointing device (e.g., mouse, touch pad, trackball), and/or a joystick. In accordance with some embodiments of the invention, the user input device 134 can be substantially similar to the controllers used in Xbox, PlayStation, Nintendo, or Wii. The user input device 134 can also shape like a gun.

In accordance with some embodiments of the invention, the motion tracker 136 can be configured to track or sense the motion or gestures of the user and transmit data representative of the detected motion or gesture information to the game console or virtual reality controller 130. Additionally, the motion tracker 136 can include facial recognition and/or voice recognition capability. The game console or virtual reality controller 130 can control the virtual representation of the user in the virtual environment to exhibit substantially the same motion or gesture as that of the user (e.g., in substantially real time). In accordance with some embodiments of the invention, the motion tracker 136 can include a camera, a sensor (e.g., a depth sensor), and a microphone. In accordance with some embodiments of the invention, the sensor of the motion tracker 136 can include an infrared laser projector and a CMOS sensor. In accordance with some embodiments of the invention, the motion tracker 136 can be substantially similar to Microsoft™ Kinect motion sensing system or a Sony™ Play Station motion sensing Camera.

The game console or virtual reality controller 130 can communicate with one or more sensing devices 110 using any wired or wireless communication band (e.g., USB, SPI, Bluetooth, WiFi, ZigBee, WMTS, cellular data, and industrial, scientific, and medical (ISM) band communications). The sensor device 110 and the game console or virtual reality controller 130 can use an industry standard communication protocol or a proprietary communication protocol. The game console or virtual reality controller 130 can include a processor and associated memory that can receive the raw sensor data or the processed sensor data from one or more sensing devices 110 and store the data in memory for further processing or for communication to a remote system for further processing, such as the game server 140. The game console or virtual reality controller 130 can include a network interface (e.g., wired such as Ethernet or wireless such as WiFi or 3G, 4G, 4G LTE mobile data) that enables the game console or virtual reality controller 130 to communicate with other systems, such as computers and the game server 140 and other sources of data and information. In accordance with some embodiments of the invention, the game console or virtual reality controller 130 and/or the game server 140 can further analyze the sensor data using analytics algorithms that either process the sensor data by itself or in combination with other available data. In accordance with some embodiments of the invention, the game console or virtual reality controller 130 can analyze the sensor data and as a function of at least the sensor data, directly communicate with another device to control that device (e.g., the display 132). For example, the game console or virtual reality controller 130 can receive sensor data from one or more sensing devices 110 indicating the level of stress in the user, and as a function of the sensor data, directly increase, decrease, or maintain the difficulty level of the game.

In accordance with some embodiments, the sensor data can be processed according to one or more algorithms or processes which determine whether one or more conditions relating to the sensor data meet one or more specified criteria (e.g., threshold values) or are likely to meet one or more specified criteria in the future. This can be accomplished by extrapolating existing data or analyzing trends in the data, to determine a predicted value for one or more conditions in the future and comparing the predicted value to a predefined threshold. For example, if the user's heart rate is increasing as demonstrated by a recorded increase in heart rate over time, based on the determined rate of change, the algorithm can determine the warning time, e.g., the amount of time it will take for the user's heart rate to reach a predefined threshold. Depending on the warning time, the game console or virtual reality controller 130 can either shut down the game or lower the difficulty level of scariness level of the game to ensure the comfort or safety of the user.

Figure 2:
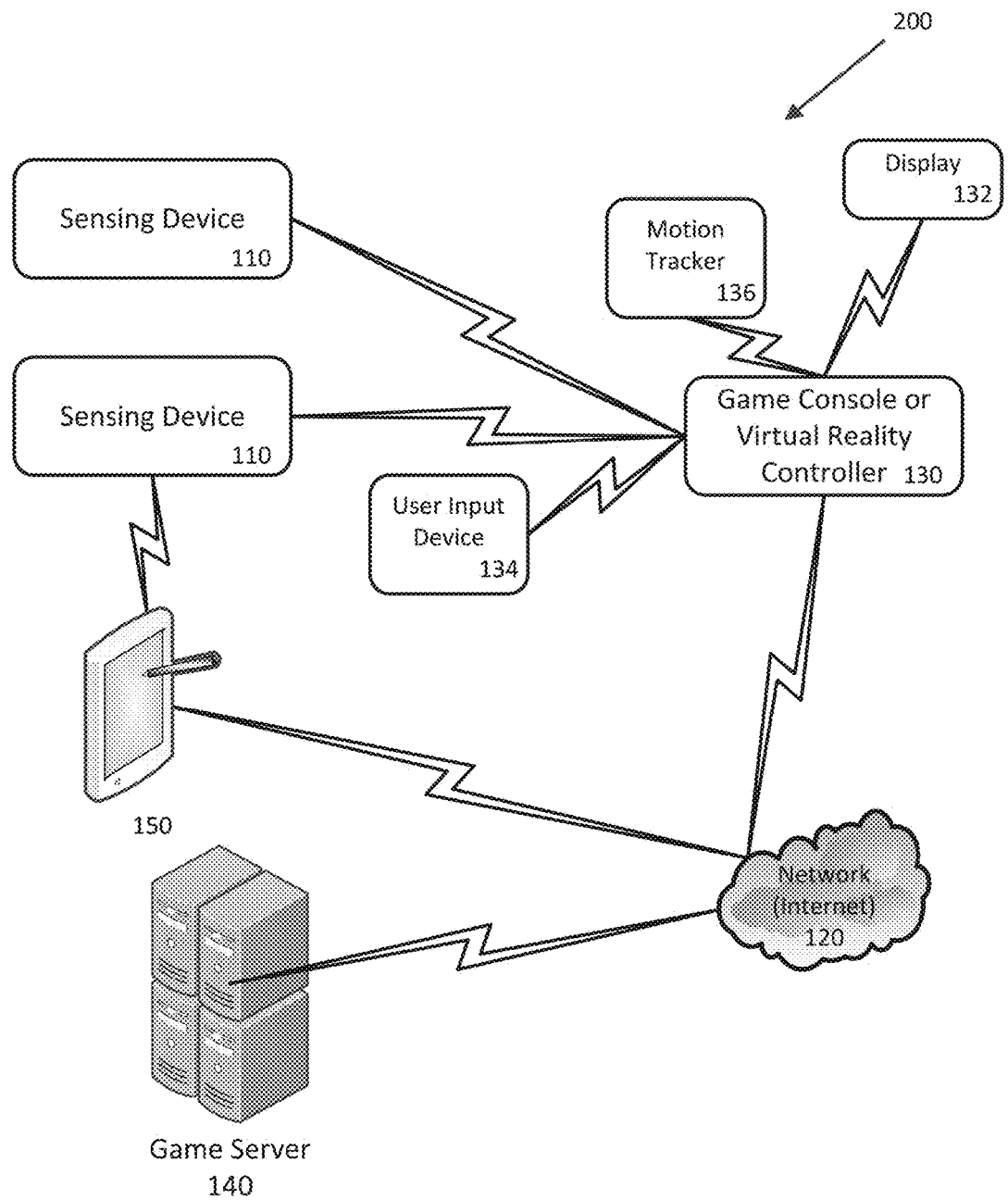
FIG. 2 is a block diagram of a system according to some embodiments of the invention.

FIG. 2 shows a system 200 similar to system 100 according to some embodiments of the invention. In this embodiment, the system 200 can include one or more sensing devices 110, a network 120, a game console or virtual reality controller 130, and a game server 140. The game server 140 can be connected to the game console or virtual reality controller 130, e.g., via a network 120 such as a LAN, or a WAN, such as the internet. The one or more sensing devices 110 can communicate with the game console or virtual reality controller 130, e.g., by transmitting sensed condition information to the game console or virtual reality controller 130. In accordance with some embodiments of the invention, the one or more sensing devices 110 can transmit sensed condition information to an external hub 150 instead of the game console or virtual reality controller 130. The external hub 150 can in turn transmit the sensed condition information to the network 120. System 200 can include many of the same components as system 100 (e.g., display 132, user input device 134, motion tracker 136) and operate similar to system 100.

One of the primary differences between system 200 and system 100 is that the game server 140 is used in system 200 to process, analyze, and/or store the sensor data. In accordance with some embodiments of the invention, the game console or virtual reality controller 130 can send the raw sensor data or the processed sensor data (or both) to the game server 140. The game server 140 can then control all or a portion of the operations of the game console or virtual reality controller 130.

The game server 140 can include one or more computers that are configured to receive the sensor data from one or more sensing devices 110. The sensor data can be transmitted by the game console or virtual reality controller 130 to the game server 140 over a public or private network. In accordance with some embodiments, the game console or virtual reality controller 130 can act as a gateway that forwards the sensor data to the game server 140 according to predefined instructions or configuration. The game server 140 can be, for example, a big data server (e.g., based on Hadoop, or another analytics engine) that can receive, store and analyze the sensor data according to a predefined analytical method or process. In accordance with some embodiments, as a result of the predefined analytical method or process, the game server 140 can generate one or more commands and/or data and send one or more of those commands and/or data to the game console or virtual reality controller 130. The commands can be used to control or change the operation of the game console or virtual reality controller 130, which in turn controls or changes the content presented on the display 132.

In accordance with some embodiments of the invention, the data stored in the game server 140 can be used by game developers to build improvements to the gaming experience.

For example, based on the sensor data, game developers can identify aspects of the game (e.g., plots, images, music, or sound) to which the user has positive or negative reactions. The gaming experience can be improved, for example, by increasing the frequency of occurrence of those aspects to which the user has positive reactions. Examples of how the gaming software can be modified and tested are described in commonly owned U.S. Patent Application Ser. No. 62/221,664, filed Sep. 22, 2015, entitled Method and System for Crowd-Sourced Algorithm Development, which is incorporated by reference in its entirety.

In accordance with some embodiments of the invention, the game console or virtual reality controller 130 can send one or more commands (e.g., an instruction to perform one or more functions or operations, or an acknowledgement that a function or operation has started or completed) and/or data (e.g., sensor data or user data) to the game server 140. The game server 140 can interpret and respond to the commands, for example, to retrieve data or process data or change the way game server 140 processes the data. The response can include a command (e.g., an acknowledgement or instruction) and/or data (e.g., data or information requested, results of an analysis or other sensor data). The game console or virtual reality controller 130 can use the data for further analysis by algorithms on the game console or virtual reality controller 130 or to determine whether one or more commands and/or data should be sent to the display 132.

Figure 3:
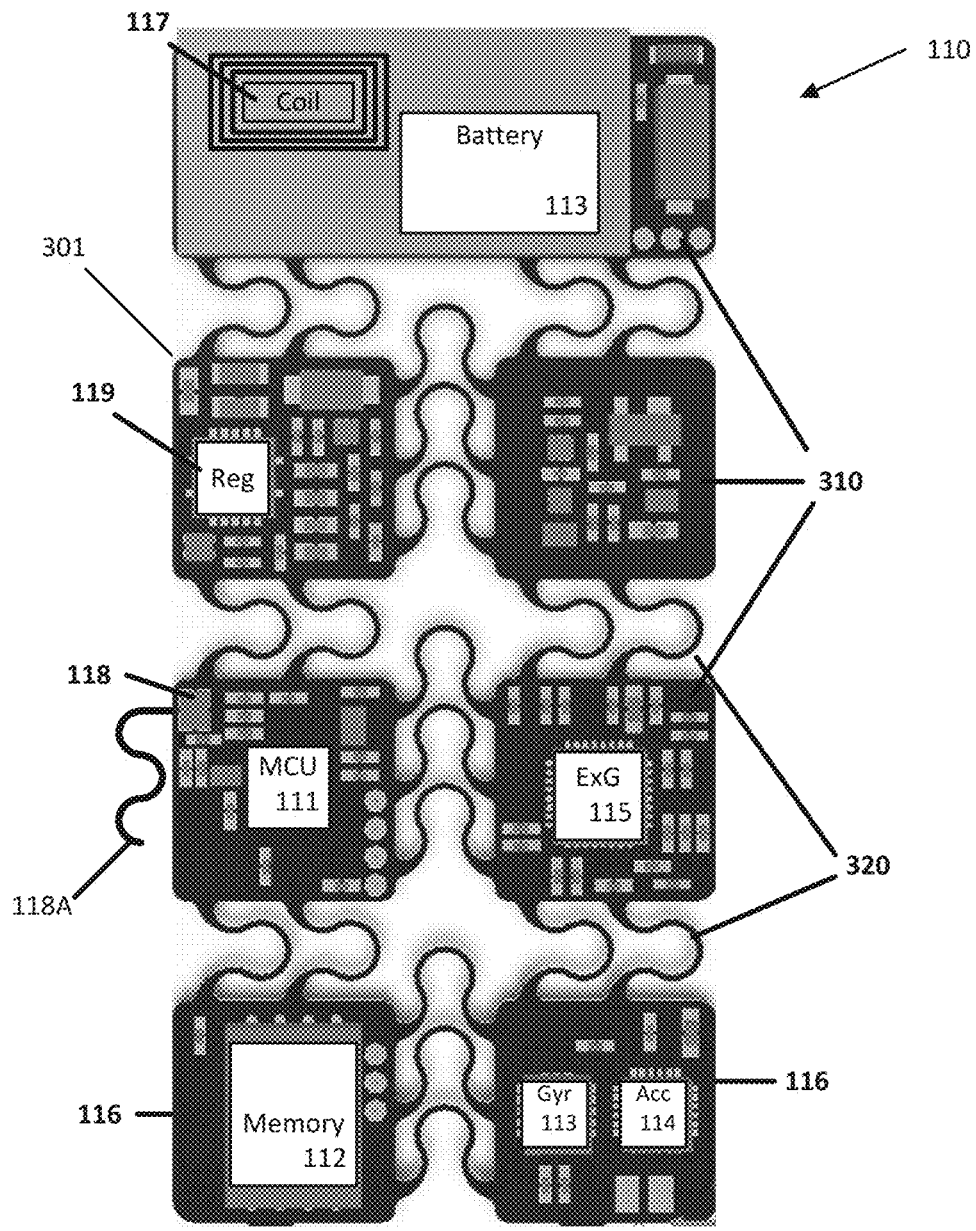
FIG. 3 is a block diagram of a sensing device according to some embodiments of the invention.

FIG. 3 shows one embodiment of a sensing device 110 according to the invention. In accordance with some embodiments of the invention, the sensing device 110 can include a plurality of components mounted on device islands 410, wherein each device island 410 can be connected to an adjacent device island 410 by a flexible interconnect 420, enabling the sensing device to flex and stretch and conform to irregular surfaces, such as those of the body of a person or subject (e.g., an animal). The sensing device 110 can be encapsulated in a flexible or stretchable material, such as, silicone or PDMS. The sensing device 110 can include an adhesive material that enables the sensing device to adhere to the skin of a person or subject or the surface of an object. The sensing device 110 can optionally include one or more user interface components, such as buttons, lights (e.g., LEDs), displays, speakers or vibrators that enable a user or person to interact with the device using visual, audible and sensory cues. These user interface components can be used to provide operational, configuration, and biometric performance feedback to a user directly, such as, through visual and tactile output capabilities via LEDs and vibration motors.

The sensing device 110 can include a processor 111 and associated memory 112 and a battery 113 which serves as a power source. An induction coil 117 can be used to charge the battery 113. The sensing device 110 can include one or more sensors, including an accelerometer 114, an ExG sensor 115 and one or more electrodes 116. The sensing device 110 can also include wireless transceiver 118 (e.g., such as Bluetooth™, WiFi, mobile data) and an antenna 118A to enable the sensing device 110 to communicate with the game console or virtual reality controller 130 and/or smart phone or hub 150.

In accordance with some embodiments, the memory 112 can store one or more computer programs, including an operating system (e.g., Linux) as well as one or more application programs, functions and processes that can be used to control the operation of the sensing device 110. One or more programs, functions or processes can be used to collect accelerometer data, which includes motion and acceleration information in 1, 2 or 3 dimensions as well as temperature data. One or more programs, functions or processes can be used to collect bio-potentials in the form of ExG data from the ExG sensor. The ExG data can include data representative of at least one of the following bio-potential signals: electrocardiogram (e.g., EKG or ECG) signals, electromyogram (e.g., EMG) signals or Electroencephalogram signals (e.g., EEG), depending on how the one or more programs, functions or processes configures the ExG sensor 115. The sensing device 110 can include one or more electrodes 116 (on the back side of the device shown in FIG. 3) that can be placed in direct or indirect contact with the skin to receive these signals. In accordance with some embodiments of the invention, the EKG data can be used to determine heart rate and heart rate variability as well as recovery rate and the EMG data can be used to determine muscle activation. In some embodiments, the placement of one or more sensors 110 on the face or neck can lead to EMG data that reflects an individual's emotional state. For example, sensor 110 can be placed such that electrodes 116 span across the cheek and lower jaw. In this manner, the EMG data can be used to indicate when a user is clenching the jaw—a sign of stress and discomfort. Similarly, sensors 110 can be positioned in other locations on the face, neck or body to detect muscle contractions that are typically associated with moods and emotional states (e.g., the back of the neck, the eyebrows, cheeks and the hands and/or wrists). In accordance with some embodiments of the invention, these bio-potential signals can be used to detect excited or fatigued states (e.g., high verses low heart rates and fast verses slow muscle responses).

In operation, the sensing device 110 can be configured using one or more programs, functions or processes to collect raw sensor data and store the data in memory 112. In accordance with some embodiments, one or more programs, functions or processes running on the processor 111 can process and/or analyze the raw sensor data and generate processed sensor data, for example, by filtering the raw data to remove noise and/or artifacts and/or to normalize the raw sensor data. In accordance with some embodiments, the raw sensor data and/or the processed sensor data can be further processed by computing descriptive analytics (e.g., minimum values, maximum values, mean values, median values, mode values, standard deviation and variance values, and higher moments such as kurtosis) on one or more sets of samples of the data, and comparing such values against the comparable values of a larger cohort of relevant individuals, or against prior measurements collected on the same individual. In accordance with some embodiments, the raw sensor data and/or the processed sensor data can be further processed to extract specific features or characteristics of the signal like the dominant frequency, range, root mean square value, correlation coefficient, heart rate, respiration rate, cadence etc. The features can be further processed using one or more algorithms (e.g. decision tree, state machine, and/or linear/logistic regression) to detect or predict events (e.g. user motion, activity types, seizure, tremor) or to detect or predict status (e.g., state of mind, mental condition and/or attitude). In accordance with some embodiments, the raw sensor data can be converted to tokens or symbols representative of two or more raw sensor data values. The raw sensor data can be processed in real time as it is received from the sensor element or it can be processed in blocks after a predefined number of raw sensor data values are received. The raw data and the processed data can be stored in memory 112, until it is transmitted to a remote device (e.g. game console or virtual reality controller 130, or smart phone or hub 150).

The sensing device 110 can process the data to generate one or more higher order biometrics, by processing the raw data to determine, for example, activity type detection, activity-specific or body location-specific performance indicators, gesture recognition, posture quality, and sleep quality. The sensing device 110 can receive and process external commands which cause the device to modify its configuration and/or operation for collection, processing, and reporting of sensor data, including turning on or off various sensor combinations, changing sampling rates and measurement ranges, modifying buffering and filtering schemes, and applying different digital signal processing and algorithms to raw sensor output to produce different streams of data and/or different sets of higher order biometrics around activity tracking, activity performance, and activity quality data. Based on the biometrics determined and/or other data, the sensing device 110 can, based on an algorithm or set of rules, select a sensing modality which is optimal for a particular activity or on-body location that has been detected, and automatically modify its configuration and/or operation for collection, processing, and reporting of sensor data, including turning on or off various sensor combinations, changing sampling rates and measurement ranges, modifying buffering and filtering schemes, and applying different digital signal processing and algorithms to raw sensor output to produce different streams of data and/or different sets of higher order biometrics around activity tracking, activity performance, and activity quality data.

In accordance to some embodiments of the invention, when the sensing device 110 is connected using, for example, the wireless transceiver 118 (e.g., Bluetooth™, WiFi or Zigbee) to the smart phone or hub 130 or implantable device 170, the raw sensor data and/or the processed sensor data can be transmitted using the wireless transceiver 118 to the game console or virtual reality controller 130 and stored in the memory of the game console or virtual reality controller 130. In accordance with some embodiments of the invention, the sensor data can be transmitted by the game console or virtual reality controller 130 to the game server 140 for long-term storage and further analysis. The sensor data can be analyzed and used to modify the software in the game console or virtual reality controller 130.

The system 100 can be configured to enable many different data flows. In accordance with some embodiments of the invention, the raw data or processed sensor data (metrics) can flow from the sensing device 110, through the game console or virtual reality controller 130, to the game server 140 or a the data storage system associated with the game server 140. The sensor data (e.g., raw or processed) can be pre-filtered, conditioned, manipulated, or combined with other data within the game console or virtual reality controller 130. The sensor data (e.g., raw or processed) can also be filtered, conditioned, manipulated, or combined with other data within the data storage and game server 140.

In accordance with some embodiments of the invention, processed sensor data or other data can flow from the game server 140 through the game console or virtual reality controller 130 and back to the sensing device 110. Processed data (e.g., commands, control instructions, or higher order information, such as, software and algorithms for system upgrades and updates) can flow from the game server 140 to the game console or virtual reality controller 130, and through the game console or virtual reality controller 130 to the sensing device 110. The data can be filtered, interpreted, validated, and/or combined with other data within the smart device. The data can also be filtered, interpreted, validated, and/or combined with other data within the sensing device 110.

Figure 4:
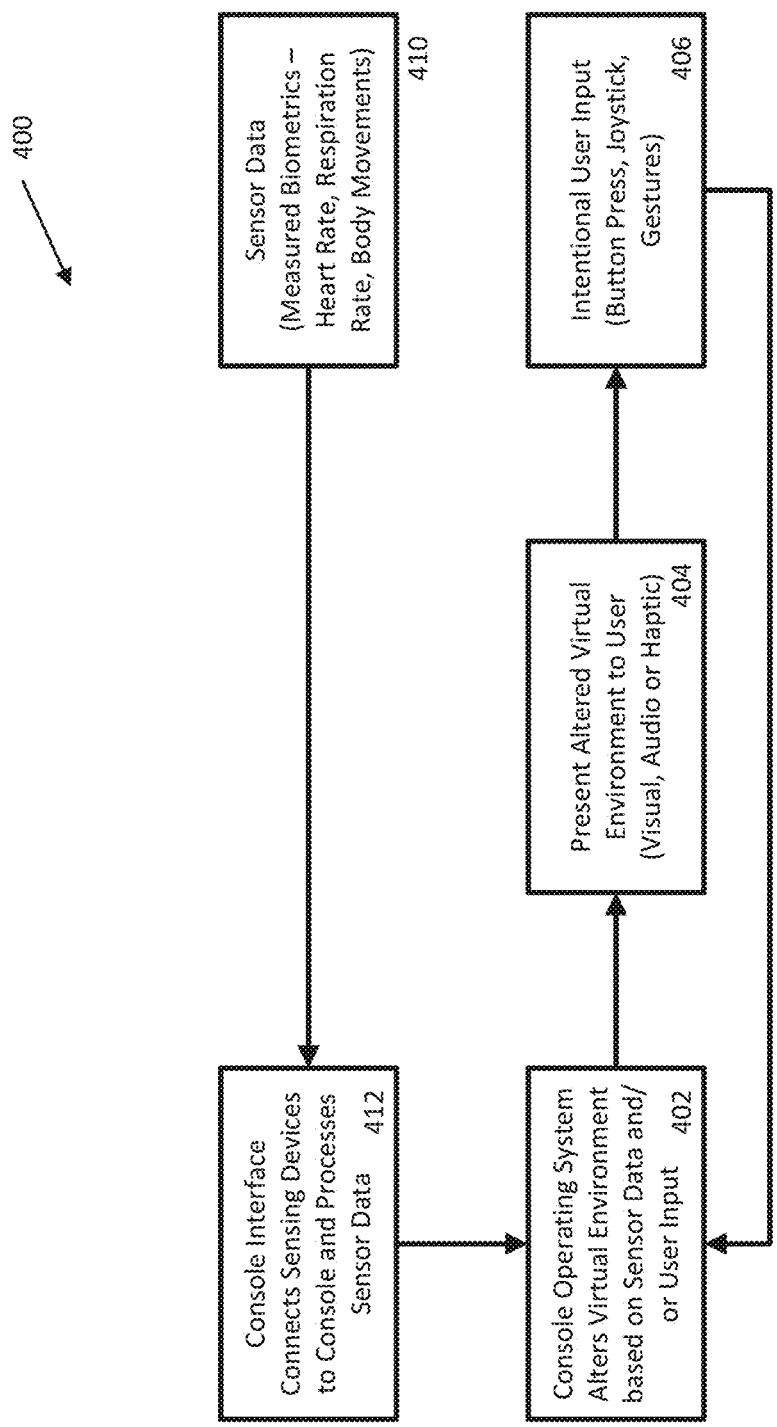
FIG. 4 is a block diagram of a system according to some embodiments of the invention.

FIG. 4 is a flow chart 400 showing the operation of the system 100 or 200 in accordance with some embodiments of the invention. In step 410, when a user is using the game console or virtual reality controller 130, one or more sensing devices 110 measures at least one physiologic and/or biologic parameter from the user to produce sensor data. At 412, a wired or wireless console interface connects the sensing device 110 and the game console or virtual reality controller 130, thereby allowing the sensor data to be transmitted from the sensing device 110 to the game console or virtual reality controller 130 (step 412). The sensor data can also be processed by the game console or virtual reality controller 130.

The virtual environment controlled by the game console or virtual reality controller 130 can be altered based on at least one of: the sensor data and intentional user input such as pressing a button, moving a joystick, using a gesture, and voice command, at 402. After the game console or virtual reality controller 130 receives and processes the sensor data (unintentional input), the game console or virtual reality controller 130, equipped with an operating system, can alter the virtual environment (e.g., visual, audio, haptic, or a combination thereof) based on the unintentional input, which is presented to the user, at 404. The virtual environment can also be altered based on intentional user input at 406. While interacting with the altered virtual environment, passively or actively, the user can intentionally provide input to the game console or virtual reality controller 130 (step 406), e.g., by pressing a button, moving a joystick, using a gesture, or voice command. The process continues at 402 with the console operating system altering the virtual environment as a function of intentional inputs (406) and unintentional inputs (412) and presenting the altered virtual environment to the user, 404.

In accordance with some embodiments of the invention, body worn conformable sensors, such as sensing device 110 can be used to quantitatively measure a variety of different physiologic and biologic parameters from the human body. These physiologic and biologic parameters include biopotentials, such as, ECG, EMG and respiration as well as acceleration and angular velocities related to motion. The ECG signals can be used to determine heart rate, heart rate variability and recovery rate. In addition ECG signals can be used to determine abnormalities associated with heart function (e.g. seizures and/or arrhythmias including tachycardias, bradycardias, atrial fibrillation, atrial flutter, and/or supraventricular tachycardias). The EMG signals can be used to determine muscle activation (e.g., contractions, spasms, tremor, rigidity, myopathy, and/or muscular dystrophy). The raw accelerometer signals can be transformed into signal parameters or features such as frequency content in specific frequency bands, acceleration vector amplitudes, acceleration vector direction changes as a function of time, etc. and these features can be correlated with relevant metrics such as heart rate, respiration rate, as well as motion related to walking, running, physical activity, posture, tremors, coughs, snoring, frailty, and falls. The accelerometer signals can also be used to detect and/or measure, for example, seizures, gait and balance problems, steps and/or cadence, energy expenditure (together with heart rate and/or respiration rate), range of motion, and other activity types (e.g., swimming, cycling, rowing, throwing, swinging, kicking, punching, etc.)

These parameters can be used for detection or prediction of medical conditions and/or as an indicator of general health and well-being of an individual. In accordance with some embodiments of the invention, a system that includes a wearable body sensor can be connected to an information gateway (e.g., smart phone or hub 130) to control a set of external devices nearby the user (e.g., lighting, heating, ventilating, and air conditioning). The system can act in a coordinated manner to provide an enhanced environmental presentation to the user.

In accordance with some embodiments of the invention, accelerometer data captured by a conformable sensing device 110 affixed to the chest can be used to detect and record multiple physiologic signals including heart rate, respiration, coughing at rest, by detecting the mechanical vibrations resulting from the motions of the chest cavity and rhythmic movements of the heart (heart rate) sensed on the chest wall. In accordance with some embodiments of the invention, heart beat information can be derived from the high frequency portion of the accelerometer signal, and respiration information can be derived from the low frequency portion of the accelerometer signal. For example, to derive heart rate information, the raw accelerometer data can be filtered through a band pass filter with a high pass cutoff frequency of 2 Hz and low pass cutoff frequency of 45 Hz. Next, the resultant of the X, Y and Z axes can be determined by taking the square root of the sum of square of each axis. To amplify the high frequency components, the signal can be differentiated. The differentiated signal can be processed by a state machine with an adaptive threshold to detect the heart beats and calculate the heart rate using a Pan-Tompkins or similar algorithm. See, Pan, Jiapu; Tompkins, Willis J., "A Real-Time QRS Detection Algorithm," *Biomedical Engineering, IEEE Transactions on*, vol. BME-32, no. 3, pp. 230, 236, March 1985, which is hereby incorporated by reference.

For example, to derive the respiration rate information, the raw accelerometer signal can be filtered using a low pass filter having a cutoff frequency of 2 Hz. The respiration rate can be estimated based on the method described in the following publication: A. Bates, M. J. Ling, J. Mann and D. K. Arvind "Respiratory Rate and Flow Waveform Estimation from Tri-axial Accelerometer Data", Proc. Int. Conf. on Wearable and Implantable Body Sensor Networks, pages 144-150, Singapore, June 2010.

In accordance with some embodiments of the invention, a single conformable sensing device 110 can be adhered to the chest to detect respiration, heart rate, physical motion (and motion frequency), and temperature using just an accelerometer sensor. The sensor data can be transmitted wirelessly to the game console or virtual reality controller 130 or the smart phone or hub 150. The smart phone or hub 150 can further process the sensor data with other data (e.g., date, time, season, ambient temperature, atmospheric pressure, GPS location, weather data, news data, historical data and personal information) and send the processed sensor data and/or other data to the game console or virtual reality controller 130 to modify the presentation to the user. For example, based on date and personal data, a character in the game or virtual environment could wish the user a happy birthday or notify them that they have an up-coming appointment.

In accordance with some embodiments of the invention, the system 100 can be used to personalize a user's experience in a video game, virtual reality, or augmented reality. In one embodiment, one or more sensing devices 110 can transmit the physiologic or biometric information (e.g., heart rate, respiration rate, or motion) to the game console or virtual reality controller 130, which controls the user's virtual representation in the game console or virtual reality controller 130 to also exhibit at least a portion of the physiologic or biometric information. For example, the virtual representation (e.g., a user's character) can have the same heart rate and/or respiration rate as the user. In a particular example, the system can monitor the user's respiration rate and use that information to sway the sniper scope while he/she is aiming in the same rhythm. In another example, the user's detected heart rate and respiration rate can be used adjust the strength or health of the user's character. At least a portion of the physiologic or biometric information can be displayed on a screen such that the information is viewable by the user or other users in the same video game or virtual reality. A summary of the physiologic or biometric information can be shown to the user at the end of a virtual reality session. For example, the user can view the statistics of his/her heart rate. In yet another example, the gait, posture, or motion of the user can be sensed by the sensing device 110 and the sensor data on the same can be transmitted to the game console or virtual reality controller 130; the game console or virtual reality controller 130 can control the user's virtual representation to exhibit the same gait, posture, or motion as the user in real time; the game console or virtual reality controller 130 can also control the user's virtual representation to exhibit an exaggerated motion compared to the real motion. The exaggerated motion can be exaggerated in intensity, speed, and/or range of motion. For example, a series of kicks by the user in the real world can be sped up in the virtual environment. Other effects can also be added to the motion in the virtual environment, such as slow motion.

In accordance with some embodiments of the invention, the system can also permit a plurality of users (e.g., at least 2, at least 5, at least 10, or at least 50) to engage with each other in a video game, virtual reality, or augmented reality on a more personal level than existing technologies. For example, a user can view the real-time heart rate or respiration rate of other users; a user can also view the motions of other users in real time which are embodied by the motions of their virtual representations in the virtual environment. The systems 100 and 200 can used for military training in battle simulations and operational training.

Figure 5:
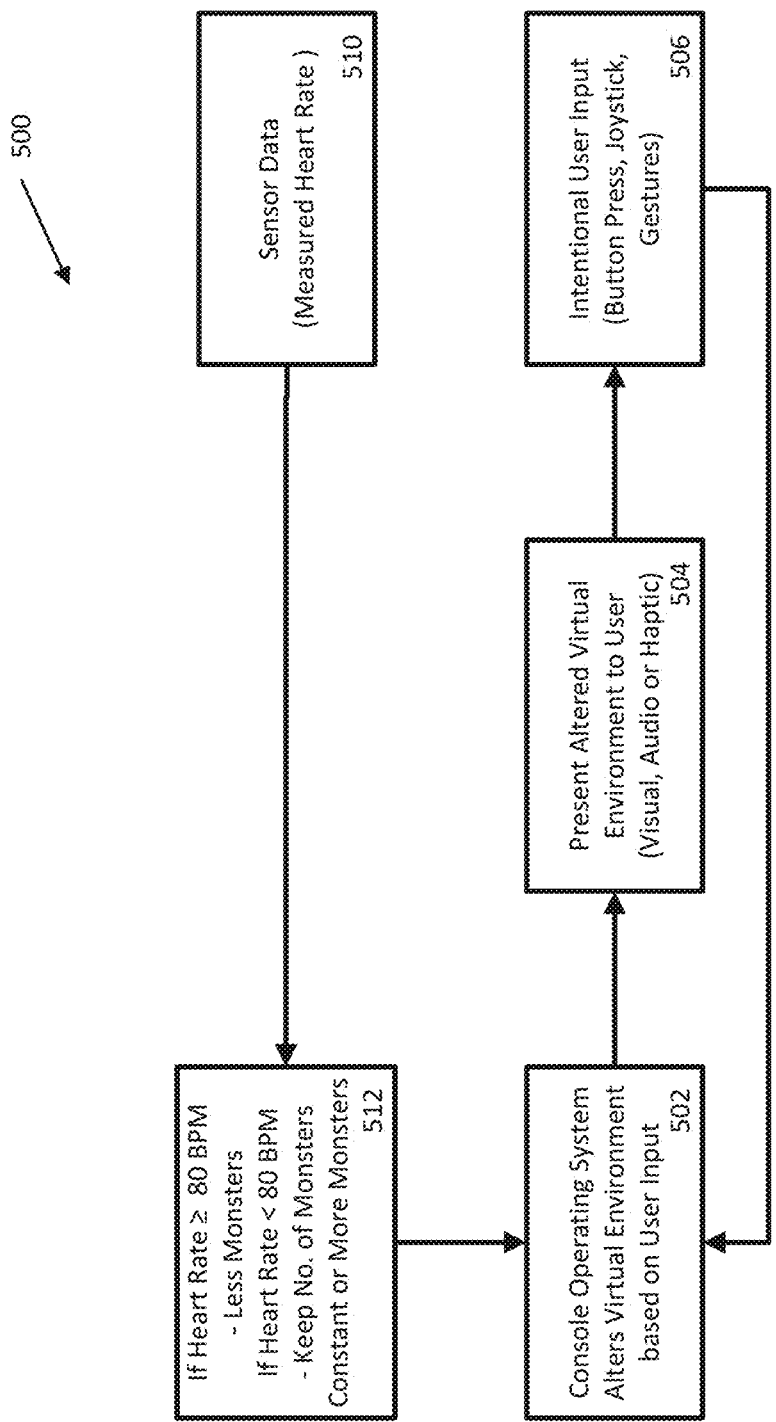
FIG. 5 is a block diagram of a system according to some embodiments of the invention.

In accordance with some embodiments of the invention, the system 100 or 200 can also personalize a user's experience in a video game, virtual reality, or augmented reality by adjusting one or more aspects of the video game, virtual reality, or augmented reality in real time based on the physiologic or biometric information measured by the sensing device 110. The physiologic or biometric information measured by the sensing device 110 can indicate the mental state of the user (e.g., stress level), which can serve as input to the game console or virtual reality controller 130. The one or more aspects of the video game, virtual reality, or augmented reality can include, but are not limited to, difficulty level, scariness level, music, sound level, dialogue, and atmosphere. FIG. 5 is a flow chart 500 illustrating how a horror video game can adjust the scariness level by adjusting the number of monsters according to the measured heart rate of the user. At the beginning of the game, a user can select the scariness level (e.g., low, medium, or high). People's tolerance for scariness can vary. For example, a low scariness level for one user can mean high scariness level for another user. The system can thus permit the game console or virtual reality controller to personalize the scariness level of the game by using the physiologic or biometric information of individual users measured by the sensing device 110. For example, a low scariness level can mean that the video presentation is modulated (e.g., controlled to limit the number of monsters and/or scary events) such that the user' heart rate is below a first predetermined level; a medium scariness level can mean that the video presentation is modulated (e.g., controlled to limit the number of monsters and/or scary events) such that the user's heart rate is at or above the first predetermined level and at or below a second predetermined level; and a high scariness level can mean that the video presentation is modulated (e.g., controlled to limit the number of monsters and/or scary events) such that the user's heart rate is above the second predetermined level.

As shown in FIG. 5, a user can set the scariness level for a video game he/she is playing to be less scary, which can correspond to a heart rate below 80 BPM. The scariness of the video game can be set, for example, according to predefined "low," "medium," and "high" levels or on a continuous scale from, for example, 1 to 100 where 1 is least scary and 100 is most scary. When the user is playing the video game, the sensing device 110 can monitor the heart rate of the user in real time, at 510. The game console or virtual reality controller 130 can adjust the frequency of monster appearance (or scary events) as a function of the measured heart rate, at 512. For example, at 502, if the measured heart rate is at or above 80 BPM, the game console or virtual reality controller 130 operating system will execute a sequence that shows less monsters (or scary events) in the video game until the user's heart rate drops below 80 BPM; if the measured heart rate is below 80 BPM, the game console or virtual reality controller 130 operating system can either keep the number of monsters constant or show more monsters in the video game until the user's heart rate increases to a threshold near 80 BPM or has a rate of increase that indicates the user's heart rate will approach 80 BPM in a future time. At 504, the altered audio visual environment is presented to the user. At 506, the user also provides intentional input using the game controller or other user interface device. At 502, the virtual environment (e.g., video game) can also be altered by the console operating system based on user input (step 506, e.g., button press, joystick, or gestures). The altered virtual environment can then be presented to the user, as shown in step 504.

Figure 6:
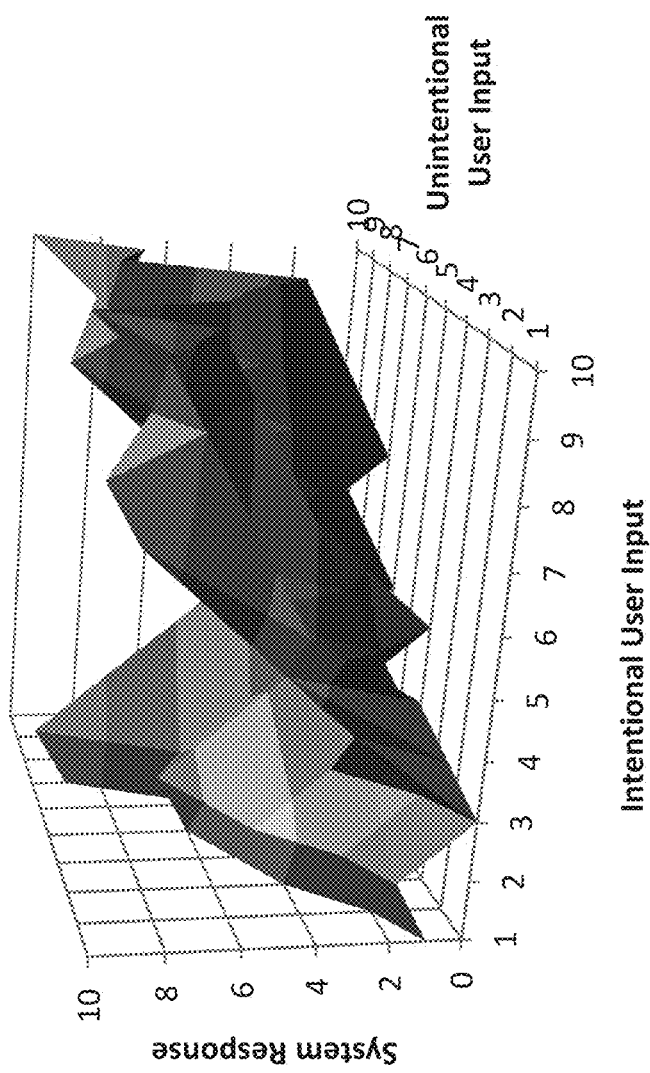
FIG. 6 shows a graph of environmental control system response as a function of intentional user input (e.g., game pad or game controller input) and unintentional user input (e.g., sensed conditions) according to some embodiments of the invention.

FIG. 6 shows a plot of the game console or virtual reality controller 130 operating system response as a function of intentional input (e.g., by the user using a game controller, joystick or other user interface device) and unintentional input (e.g., sensor data from sensing devices 110). In accordance with some embodiments, the game console or virtual reality controller 130 operating system can be programmed to respond according to the states or values of specific intentional and unintentional user inputs. The plot shows that system can generate different response profiles as a function of the character of the inputs. Depending upon whether an input is intentional or unintentional and type of input (e.g., joystick, button press, ECG, EMG, EEG, motion, GSR) and the user status information that can be derived from those inputs, the game console or virtual reality system can output a programmed response to the user and that response can be weighted or tempered according to program functions that include the unintentional inputs as well as the intentional inputs as input parameters. For example, unintentional inputs can be generated by EMG, EEG, EMG, motion or GSR sensors that indicate unconscious responses to a virtual environment (e.g., a smile or a frown, sweating, and/or muscles tensing) that can be used with or without intentional user inputs (e.g., game controller operations such as joystick movement or button presses) to provide inputs to virtual reality system to change the flow or operation of the system or trigger a pre-designated system response.

In accordance with some embodiments of the invention, the system can also present personalized advertisements to the user based on the sensor data. Coupons associated with the advertisement can also be presented. For example, when the sensor data indicate that the user is thirsty, the game console or virtual reality controller 130 may show, on the display, an advertisement related to sports drinks.

In accordance with some embodiments of the invention, the virtual environment can be a video game. The video game can be a single-player game or multi-player game. In accordance with some embodiments of the invention, the virtual environment can be a simulator for operating a vehicle (e.g., automobiles, trains, planes, boats, fighter jets), for sports (e.g., golf, tennis, shooting), or for operating a machinery. In accordance with some embodiments of the invention, the virtual environment can be overlayed on the real environment, e.g., as in augmented reality.

In accordance with some embodiments of the invention, one or more sensing devices 110 can used to provide a more immersive virtual or augmented reality experience incorporating the motion of multiple body parts in the experience and bring a greater level of detail to the simulation (e.g., making it closer to reality). For example, in combat training, sensing devices 110 can be placed on multiple locations, the head, the hands, the feet, the arms, and in various configurations to more accurately simulate the position of the user and the user's body.

In accordance with some embodiments of the invention, one or more sensing devices 110 can be used to determine how a person is feeling (e.g., emotional states, such as stress levels as function of heart and respiration rates, emotional states based on body posture using accelerometer and/or gyroscope position data, temperature and perspiration—GSR, capacitive or volumetric perspiration measurement, EMG signals from facial muscle groups correlate with facial expressions associated with emotional states including, frowning—sadness or disappointment, smiling—happiness, shock—surprise, etc.). This information can be used to evaluate and record one or more user's response to an audio visual presentation (e.g., a scene in a video game, a commercial advertisement, a bill board), to food a person is eating, to a physical activity (e.g., a roller coaster ride, physical training, in combat, flying, riding public transportation).

In accordance with some embodiments of the invention, the one or more sensing devices 110 can be used to determine the user's state of alertness, for example while driving a motor vehicle or operating dangerous or heavy equipment. If a sensing device 110 indicates that a person's head is nodding or their heart rate or respiration rate are dropping (e.g., as if going to sleep), the control system 130 or smart phone or hub 150 can sound an alarm and/or cause the motor vehicle or equipment to go on auto-pilot mode or execute a controlled stop.

In accordance with some embodiments of the invention, the one or more sensing devices 110 can be used to enhance a video game experience. The conditions (e.g., heart rate, respiration rate, ExG levels or metrics derived therefrom) sensed by the sensing devices 110 can be made available to other users during in-game play. The conditions sensed can be used to make the environment more realistic, for example, the user's character can appear to breathe heavy if the user is breathing heavy and this can impact the character's performance in the game.

In accordance with some embodiments of the invention, one or more sensing devices can be used with a health and fitness virtual reality controller 130 that monitors the user's heart rate, respiration rate, hydration, perspiration, posture and other vital signs and changes the level of difficulty in real time of an exercise machine or an exercise video to challenge users and improve their performance. The health and fitness virtual reality controller 130 can, for example, add challenges (e.g., increase the incline of a treadmill or the resistance of exercise bike or elliptical running machine) as a function of sensed conditions of the user. Where multiple users are exercising together, the system can limit the challenges based on the known capabilities of all the users or handicap the users and provide different levels of challenges based each user's capabilities.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A system comprising:
   at least one sensing device having at least one sensor configured to sense at least one physiologic or biometric condition of a person;
   a game console or virtual reality controller configured to produce a virtual environment, wherein the game console or virtual reality controller is in communication with the at least one sensing device and configured to receive sensor data from the at least one sensing device, whereby the game console or virtual reality controller adjust the virtual environment by determining a reaction of the person to an aspect in the virtual environment as a function of the sensor data and increasing a frequency of the occurrence of the aspects in the virtual environment.

2. The system according to claim 1, comprising at least two sensing devices.

3. The system according to claim 1, wherein the at least one physiologic or biometric condition is selected from the group consisting of heart rate, heart rate variability, respiration rate, respiration rate variability, skin temperature, core temperature, blood pressure, gait, posture, muscle potential, motion, and stride length.

4. The system according to claim 1, wherein the at least one sensing device is in contact with the skin of the person.

5. The system according to claim 1, wherein the at least one sensing device includes at least one of: an accelerometer, a temperature sensor, a gyroscope, a light sensor, an ECG sensor, a sound sensor, and one or more electrodes.

6. The system according to claim 1, wherein the game console or virtual reality controller presents the virtual environment on a display.

7. The system according to claim 1, wherein the game console or virtual reality controller is connected to a controller.

8. The system according to claim 1, wherein the game console or virtual reality controller is connected to a motion tracker.

9. The system according to claim 1, wherein the game console or virtual reality controller is configured to analyze the sensor data.

10. The system according to claim 1, wherein the game console or virtual reality controller is connected to a game server, whereby the game console or virtual reality controller transmits the sensor data to the game server.

11. The system according to claim 1, wherein the game server is configured to analyze the sensor data.

* * * * *